US007767066B2

(12) United States Patent
May et al.

(10) Patent No.: US 7,767,066 B2
(45) Date of Patent: Aug. 3, 2010

(54) INTEGRATED ELECTROCHEMICAL REACTOR AND PROCESS THEREFOR

(75) Inventors: Michael A. May, 17 N. Smithville Rd., Dayton, OH (US) 45403; John E. Kuo, Dayton, OH (US)

(73) Assignee: Michael A. May, Dayton, OH (US)

( * ) Notice: Subject to any disclaimer, the term of this patent is extended or adjusted under 35 U.S.C. 154(b) by 1564 days.

(21) Appl. No.: 11/063,201

(22) Filed: Feb. 22, 2005

(65) Prior Publication Data

US 2006/0185987 A1 Aug. 24, 2006

(51) Int. Cl.
*C25B 9/00* (2006.01)
(52) U.S. Cl. .................. 204/242; 204/271; 204/272; 204/275.1
(58) Field of Classification Search .......... 204/242, 204/271, 272, 275.1
See application file for complete search history.

(56) References Cited

U.S. PATENT DOCUMENTS

| | | | |
|---|---|---|---|
| 3,336,215 A | 8/1967 | Hagen | |
| 3,485,742 A | 12/1969 | Emich et al. | |
| 3,755,128 A | 8/1973 | Herwig | |
| 3,870,616 A | 3/1975 | Dempsey et al. | |
| 4,078,985 A | 3/1978 | Takeuchi | |
| 5,494,559 A | 2/1996 | Patterson | |
| 5,607,563 A | 3/1997 | Patterson et al. | |
| 6,248,221 B1 | 6/2001 | Davis et al. | |

OTHER PUBLICATIONS

Blubaugh et al. (Blubaugh) Vacuum Thin-Layer Electrochemical Cell for Nonaqueous Spectroelectrochemistry 1982. Anal. Chem. 54, 329-331.*
A.J. Bard, "The Electrochemistry of Organic Compounds in Aprotic Solvents-Methods and Applications", *Pure and Applied Chemistry*, 25, 379-393 (1971).
N.E. Tokel, C.P. Keszthelyi, A.J. Bard, "Electrogenerated Chemiluminescence-X. $\alpha,\beta,\gamma,\delta$-Tetraphenylporphin Chemiluminescence", *Journal of the American Chemical Society*, 94, 4872-4877 (1972).
C.D. Schmulbach, T.V. Oommen, "Vacuum-Line Electrochemical Cell for Electrosynthesis", *Analytical Chemistry*, 45, 820-821 (1973).

(Continued)

*Primary Examiner*—Arun S Phasge
(74) *Attorney, Agent, or Firm*—R. William Graham

(57) ABSTRACT

An electrochemical reactor and process for electrolyzing a substance to change at least a portion of the substance from a first state to a second state. The reactor comprises a tubular body having a first end portion defining an opening and a second end portion defining an electrolysis chamber. The electrolysis chamber includes a well adapted to hold the substance and at least two electrodes for electrolyzing the substance in the well. The volume of the well is less than about 3 milliliters. The reactor further comprises a coupling for releasably and sealingly connecting the reactor body to an auxiliary device body. The coupling is adapted to provide a vacuum tight seal between the reactor body and the auxiliary device and to allow the reactor body to rotate about an axis of rotation independent of the auxiliary device while the reactor body is sealingly connected to the auxiliary device.

20 Claims, 8 Drawing Sheets

OTHER PUBLICATIONS

J.D. Holloway, F.C. Senftleber, W.E. Geiger, "Vacuum Electrochemical Cell applied to the oxidation of Bis(cyclopentadienyl)chromium", *Analytical Chemistry*, 50, 1010-1013 (1978).

H. Kiesele, "Electrochemical Cell for Voltammetry, Coulometry, and Synthesis in Superdry Media", *Analytical Chemistry*, 53, 1952-1954 (1981).

E.A. Blubaugh, L.M. Doane, "Vacuum Thin-Layer Electrochemical Cell for Nonaqueous Spectroelectrochemistry", *Analytical Chemistry*, 54, 329-331 (1982).

J.R. Kirk, D. Page, M. Prazak, V. Katovic, "Electrochemical Studies of Niobium Chloride in "superdry" Acetonitrile: Electron-Transfer-Induced Ligand-Exchange Reactions", *Inorganic Chemistry*, 27, 1956-1963 (1988).

L. Echegoyen, A. Decian, J. Fischer, J.-M. Lehn, "Cryptatium: A Species of expanded Atom/Radical Ion Pair type from Electroreductive Crystallization of the Macrobicyclic Sodium Tris(Bipyridine) Cryptate", *Angewandte Chemie* (International edition), 30, 838-840 (1991).

Demortier and Bard, "Electrochemical reactions of Organic Compounds in Liquid Ammonia. I. Reduction of Benzophenone", *Journal of the American Chemical Society* 95:11, pp. 3495-3500 (1973).

\* cited by examiner

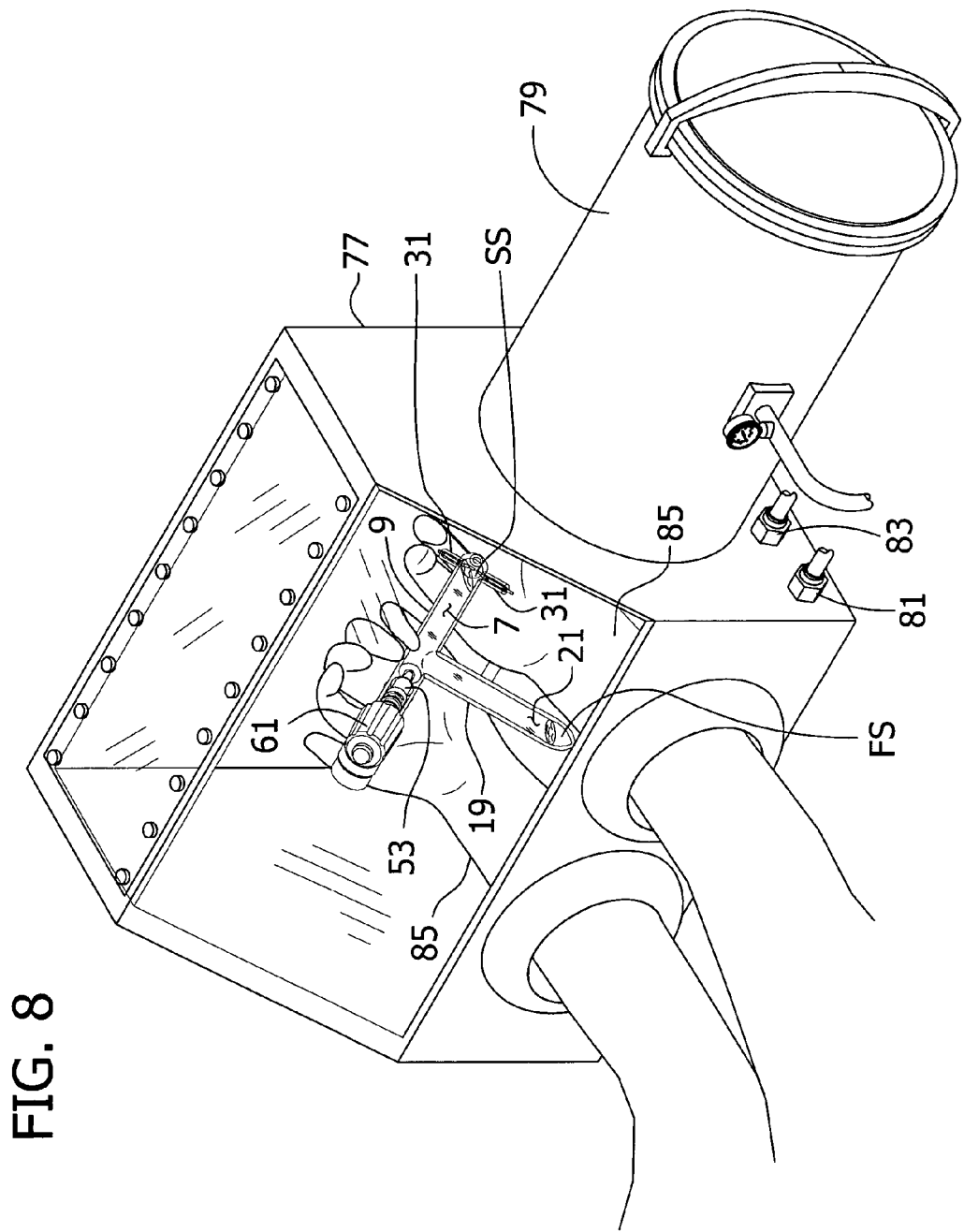

INTEGRATED ELECTROCHEMICAL REACTOR AND PROCESS THEREFOR

BACKGROUND OF THE INVENTION

This invention relates generally to reactors for performing chemical reactions, and more particularly to a reactor in which at least one of the chemical reactions is caused by electrolysis.

Generating products by electrolyzing a chemical compound into its constituent elements, one of which may be a gas, is known in the art. Typically, a direct current is applied across a pair of electrodes in contact with an electrolyte to cause decomposition of the electrolyte into one or more product gases.

Electrochemical reactors can be utilized for the production of various gases. For example, in the production of hydrogen gas, typically an electric current is passed between spaced electrodes in an aqueous electrolyte solution (e.g., water). Some fraction of water molecules ionize and the positively charged hydrogen ions migrate to the cathode electrode, while the negatively charged oxygen-containing ions-migrate to the anode electrode. The hydrogen ions undergo a reduction at the cathode, as they require electrons to neutralize their positive charges. This reduction produces bubbles of hydrogen gas, which rise to the surface of the aqueous electrolyte solution where they can be collected. Other gases, such as carbon dioxide and oxygen, for example, can also be produced by electrolysis, depending on the choice of electrodes and/or electrolyte solution.

Known electrolysis systems come in various shapes and sizes, and may have many different applications. For example, in U.S. Pat. No. 6,572,740, Rosenblum et al. describe an electrolytic cell using 0.15 ml to 100 L of an electrolytic solution, wherein the electrolytic cell can be used as a gas generator in a drug delivery device. Electrolysis systems can also be used in the microbial treatment of waste material. For example, in U.S. Pat. No. 3,992,268, Antos describes a method for treating waste materials comprising reacting a microorganism with a waste material which produces a carboxylic acid and subsequently electrolyzing the carboxylic acid product in an electrochemical cell, producing carbon dioxide.

German chemist Adolf Wilhelm Hermann Kolbe first demonstrated that the electrochemical oxidative decarboxylation of carboxylic acid salts leads to the synthesis of organic radicals which dimerize. This reaction is known as the Kolbe process, or the Kolbe reaction. A by-product produced during this synthesis reaction is carbon dioxide. By way of example, Law, Jr. et al. describes in U.S. Pat. No. 6,238,543 a method of performing the electrolytic coupling of carboxylic acids via the Kolbe reaction using a novel polymer electrolyte membrane reactor.

Research has indicated that the carbon dioxide produced during the Kolbe reaction is produced predominantly from the C1-position of small carboxylates, such as acetic acid. (See, for example, Wilson, C. T.; Lippencott, W. T., J. Am. Chem. Soc. 1956, 78, 4290-4294; Ross, S. D.; Finkelstein, M.; Petersen, R. C., J. Am. Chem. Soc. 1964, 86, 4139-4143; Belanger, G.; Lamarre, C.; Vijh, A. K., J. Electrochem. Soc. 1975, 122, 46-50). Thus, Kolbe electrolysis can be used to measure isotope enrichment of certain elements in isotopically enriched compounds. For example, Kolbe's electrolysis reaction has been used to measure isotope enrichment at certain carbon positions of carboxylic acids. According to this process, 13-carbon-enriched carboxylic acids, such as formic acid, acetic acid, and propanoic acid, are electrolyzed to produce carbon dioxide. This carbon dioxide can then be analyzed by a gas analyzer to determine the specific ratios of various carbon isotopes. Additionally, other isotopically enriched compounds, such as water, dicarboxylic acids, keto acids, and salts thereof may be analyzed in this manner. This technique and apparatuses thereto are described in May et al., *Vacuum Electrolysis Reactor Technique for Quantitation of 13-Carbon Isotope Enrichment at the C1-Position of Formic Acid and Acetic Acid*, Anal. Chem. 2004, 76, 5313-5318, which is hereby incorporated by reference in its entirety.

It is important in the analysis of carbon isotope ratios through carbon dioxide measurement to provide gas samples that are not substantially contaminated with other carbon isotopes, such as predominantly occurring 12-carbon that may result in inaccurate measurements. Additionally, isotopic-carbon-enriched carboxylic acids can be extremely expensive, so it is typically necessary to use small amounts for various analytical measurements. Further, once the carbon dioxide is produced through the Kolbe electrolysis reaction, it must be analyzed by some type of gas analyzer, such as a gas chromatograph and/or a mass spectrometer. Therefore, the gas must be easily removed or otherwise readily accessible for subsequent analysis without substantial loss or contamination.

It would be desirable, therefore, to provide an electrolysis system for the net production of carbon dioxide which is durable, transportable, requires only a small amount of electrolyte solution, and which prevents the decontamination of the reaction products through leaking or other source of contaminants.

SUMMARY OF THE INVENTION

In general, this invention is directed to an electrochemical reactor comprising a reactor body. The reactor body has a mixing chamber for mixing a first substance with a second substance to form a mixture, and an electrolysis chamber for electrolyzing the mixture thereby to change at least a portion of the mixture from a first state to a second state. The electrolysis chamber is in spatial communication with the mixing chamber for allowing the mixture within the reactor body to be transferred from the mixing chamber to the electrolysis chamber. A coupling allows the reactor body to be releasably and sealingly connected to an auxiliary device. The coupling is adapted to provide a vacuum tight seal between the reactor body and the auxiliary device, and to allow the reactor body to rotate about an axis of rotation independent of the auxiliary device while the reactor body is sealingly connected to the auxiliary device.

In another aspect, the present invention is directed generally to a reactor for electrolyzing a substance to change at least a portion of the substance from a first state to a second state. The reactor comprises a tubular body having a first end portion defining an opening, and a second end portion defining an electrolysis chamber. The electrolysis chamber comprises a well adapted to hold the substance. The volume of the well is less than about 3 milliliters. At least two electrodes for electrolyzing the substance have at least portions thereof located within the well.

In yet another aspect, the present invention is directed generally to a process for performing an electrogenerated reaction. The process comprises steps of placing a known quantity of a first substance into a reactor through an opening in the reactor. The reactor has an internal volume including a mixing chamber and an electrolysis chamber separate from the mixing chamber. The first substance is placed into one of the mixing chamber and electrolysis chamber. In another step of the process, a known quantity of a second substance is placed into another of the mixing chamber and the electrolysis chamber free of the first substance. The opening of the reactor is sealed to isolate the internal volume of the reactor and the reactor is rotated such that the substance in the electrolysis chamber is transferred to the mixing chamber for mixing with the other substance to form a mixture. The reactor is again rotated such that the mixture in the mixing chamber is transferred to the electrolysis chamber. Another step of the process includes electrolyzing the mixture in the electrolysis chamber to change at least a portion of the mixture from a first state to a second state by passing electrical current between an anode and a cathode positioned in the electrolysis chamber in spaced relation relative to one another. The reactor is connected to an analyzer to measure the amount of electrogenerated mixture in the second state.

Other features of this invention will be in part apparent in part pointed out hereinafter.

BRIEF DESCRIPTION OF THE DRAWINGS

FIG. 8 is a perspective of the electrolysis reactor received in a glove box.

Corresponding parts are designated by corresponding reference numbers throughout the drawings.

DETAILED DESCRIPTION OF PREFERRED EMBODIMENTS

Figure 1:
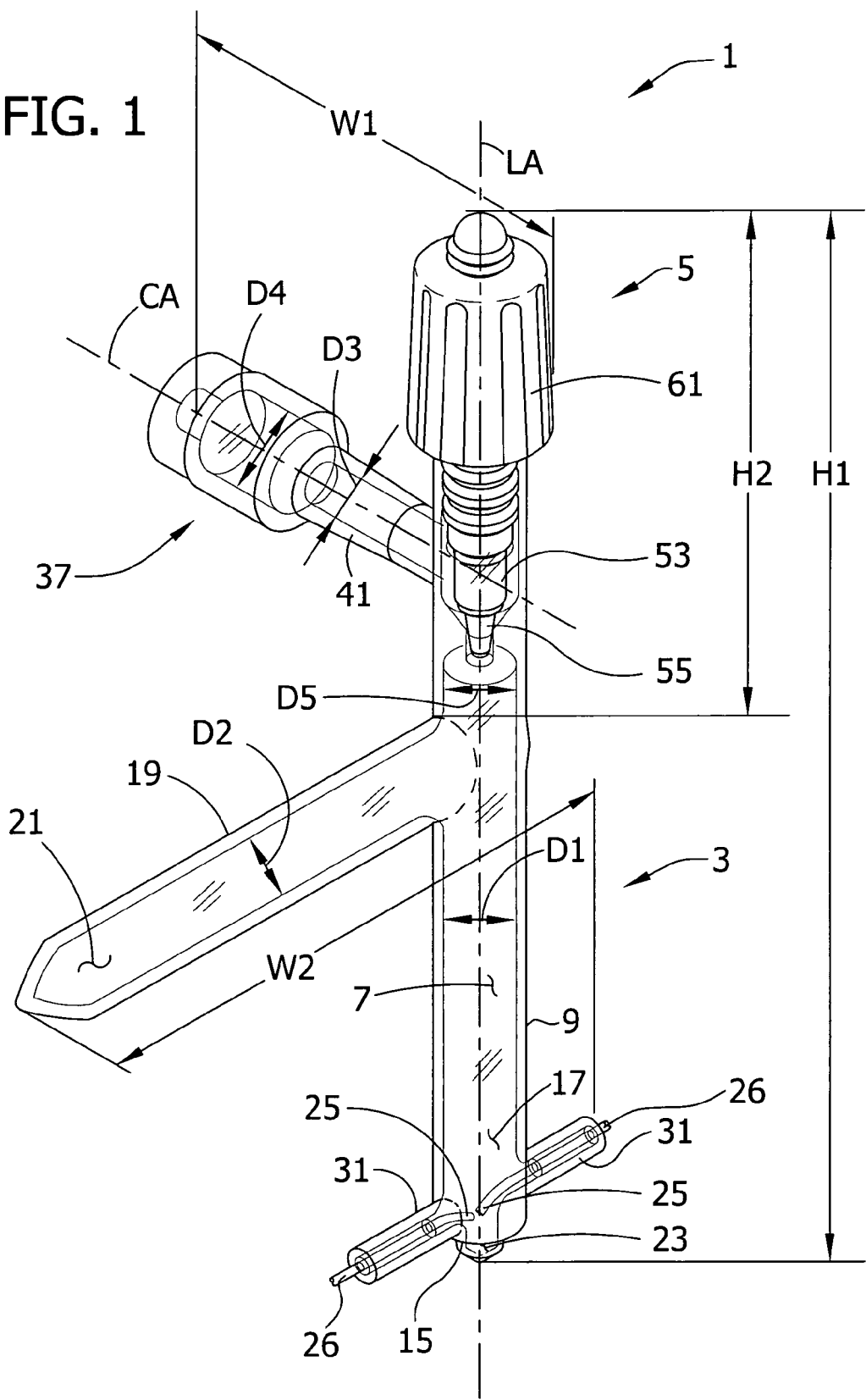
FIG. 1 is a perspective of one embodiment of an electrolysis reactor of this invention.
Figure 2:
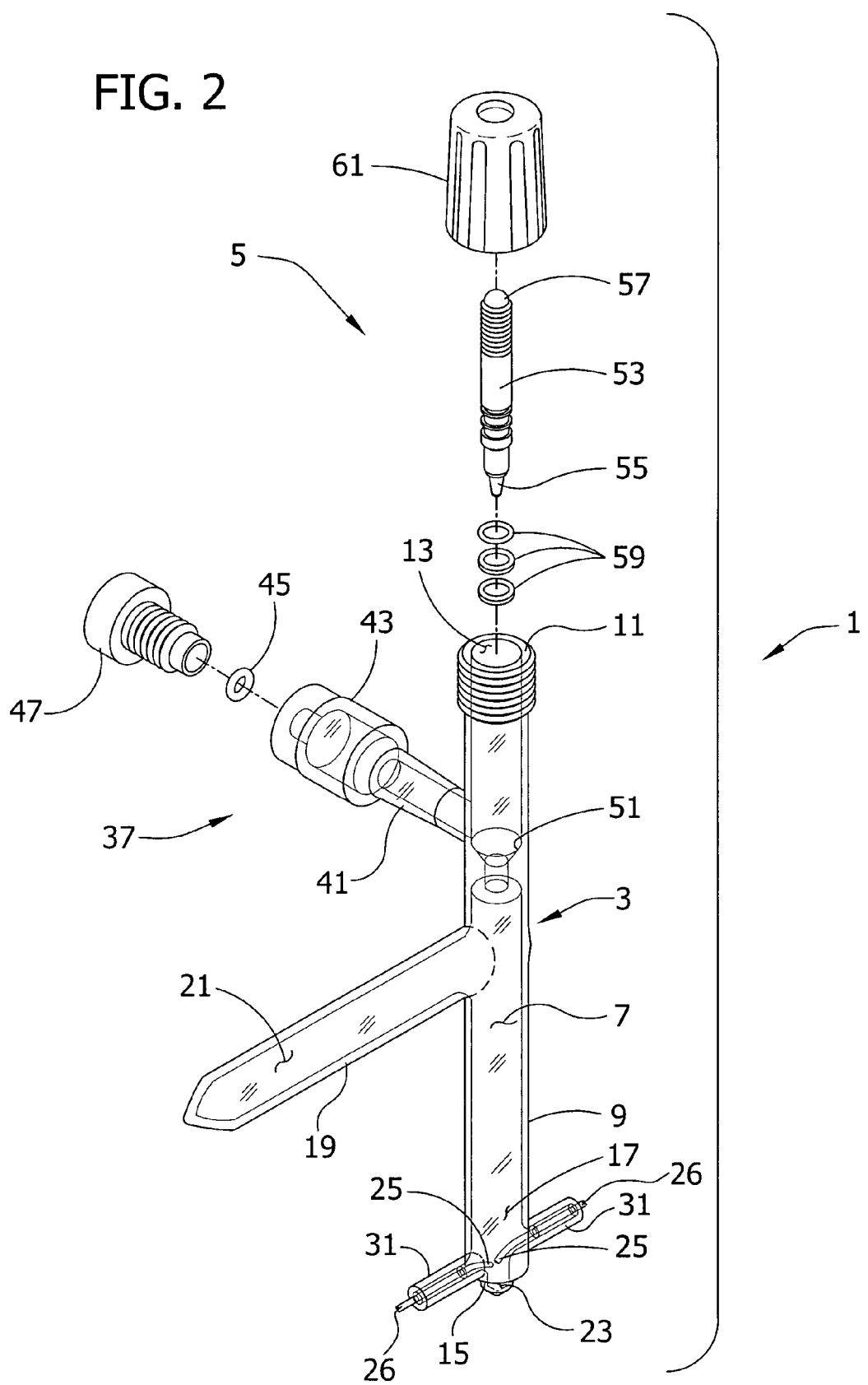
FIG. 2 is an exploded view of the electrolysis reactor of FIG. 1.

Referring now to the drawings, and particularly to FIGS. 1 and 2, an electrochemical reactor (also known as an electrolysis reactor) is designated in its entirety by the reference numeral 1. As shown, the electrolysis reactor comprises a reactor body indicated generally at 3 and a valve indicated generally at 5 for sealing the reactor. The reactor body 3 is an integrated structure defining an internal volume 7 for performing chemical reactions and, more specifically, chemical reactions wherein at least a portion of the reaction is performed by electrolysis. The internal volume 7 of the reactor body 3 in the illustrated configuration is approximately 20 milliliters, but this volume may be greater or less without departing from the scope of this invention. Preferred volumetric ranges are 4 milliliters to 50 milliliters, 4 milliliters to 25 milliliters, and 4 milliliters to 10 milliliters. The reactor body 3 can be formed from borosilicate glass having a wall thickness of about 1.5 millimeters, for example. Other inert materials may also be used.

The reactor body 3 comprises an elongate reactor tube 9 having an upper end portion 11 defining an opening 13 and a closed lower end portion 15 defining an electrolysis chamber 17. The reactor body 3 also includes a first tubular side extension 19 projecting laterally from the elongate tube to define a mixing chamber 21. In the embodiments of FIGS. 1-5, the side extension 19 projects at an angle of about 90° relative to a longitudinal axis LA of the tube 9, but it will be understood that this angle may vary without departing from the scope of this invention. In addition, the first side extension 19 has a length of about 100 millimeters and an inner diameter D2 of about 10 millimeters. The tube 9 also has an inner diameter D1 of about 10 millimeters. These dimensions are exemplary only and can vary without departing from the scope of this invention.

Figure 4:
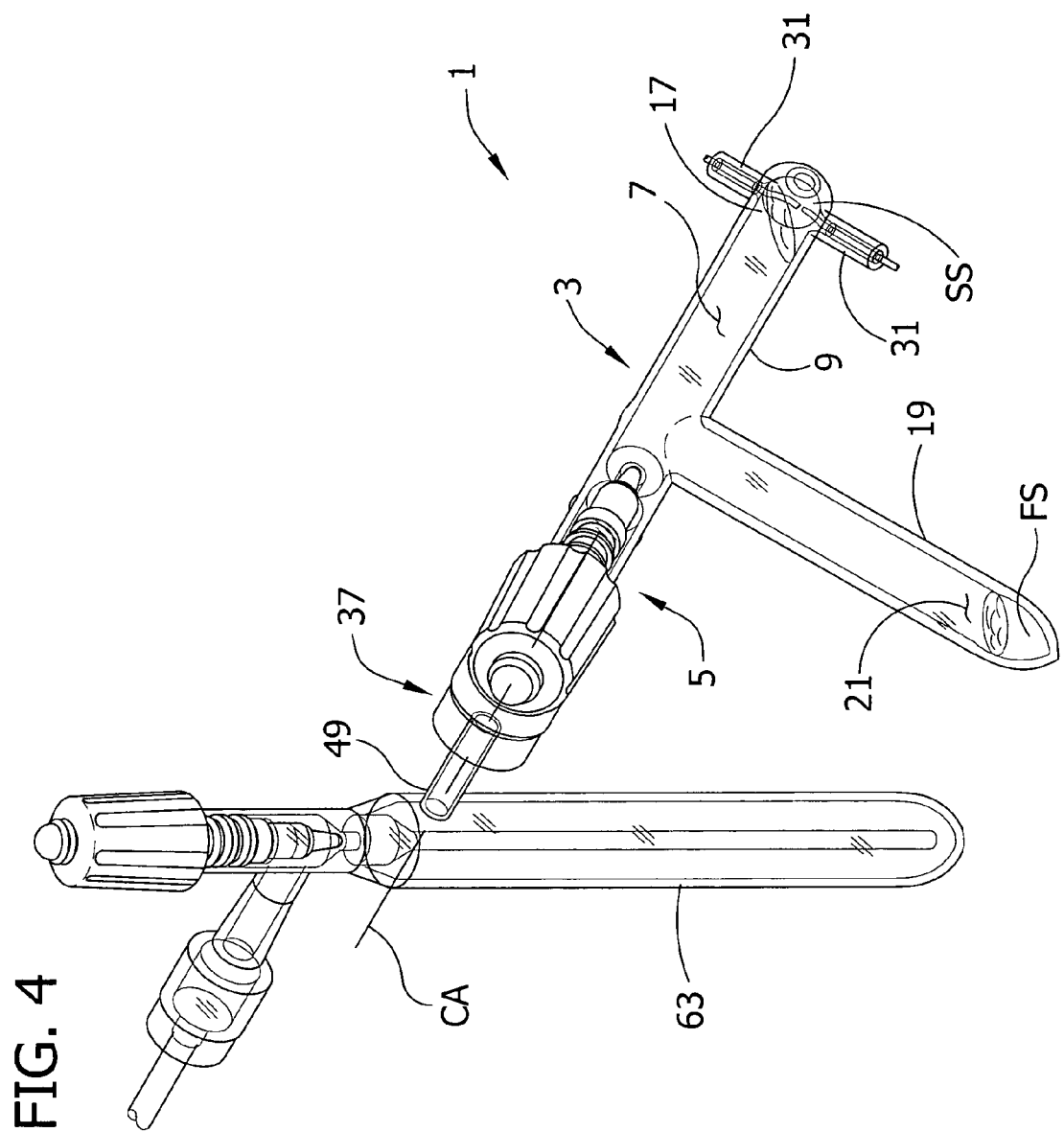
FIG. 4 is a perspective of the electrolysis reactor rotated about 45° about the coupling.
Figure 5:
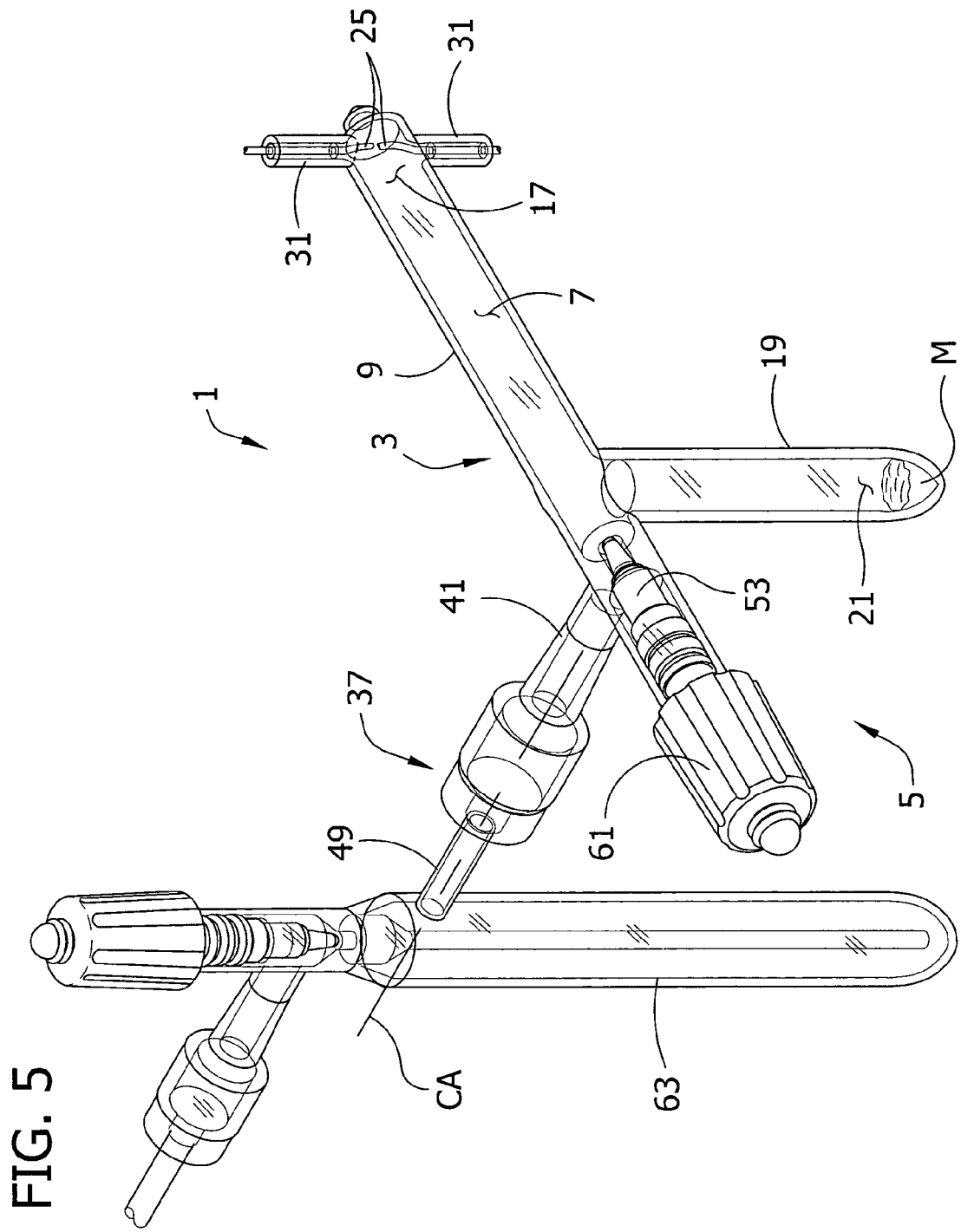
FIG. 5 is a perspective of the electrolysis reactor rotated about 90° about the coupling

The mixing chamber 21, which is in spatial communication with the electrolysis chamber 17, is sized and shaped for allowing a first substance FS to be mixed with a second substance SS, such as a reactant, to form a mixture M (FIGS. 4 and 5). Thus, the mixing chamber 21 allows substances FS, SS to be mixed together within the reactor body 3 remote from the electrolysis chamber 17. This is advantageous because some of the components of the electrolysis chamber 17, which are described in detail below, might otherwise be susceptible to damage during the mixing process. In the illustrated embodiment, the mixing chamber 21 has a volume of approximately 6 milliliters, but the volume may vary without departing from the scope of this invention. For example, the mixing chamber 21 may have a volume between about 1 milliliters and about 50 milliliters or more particularly, between about 2 milliliters and about 10 milliliters. As will be described, a mixture M in the mixing chamber 21 can be transferred to the electrolysis chamber 17 by rotating the reactor.

Figure 6:
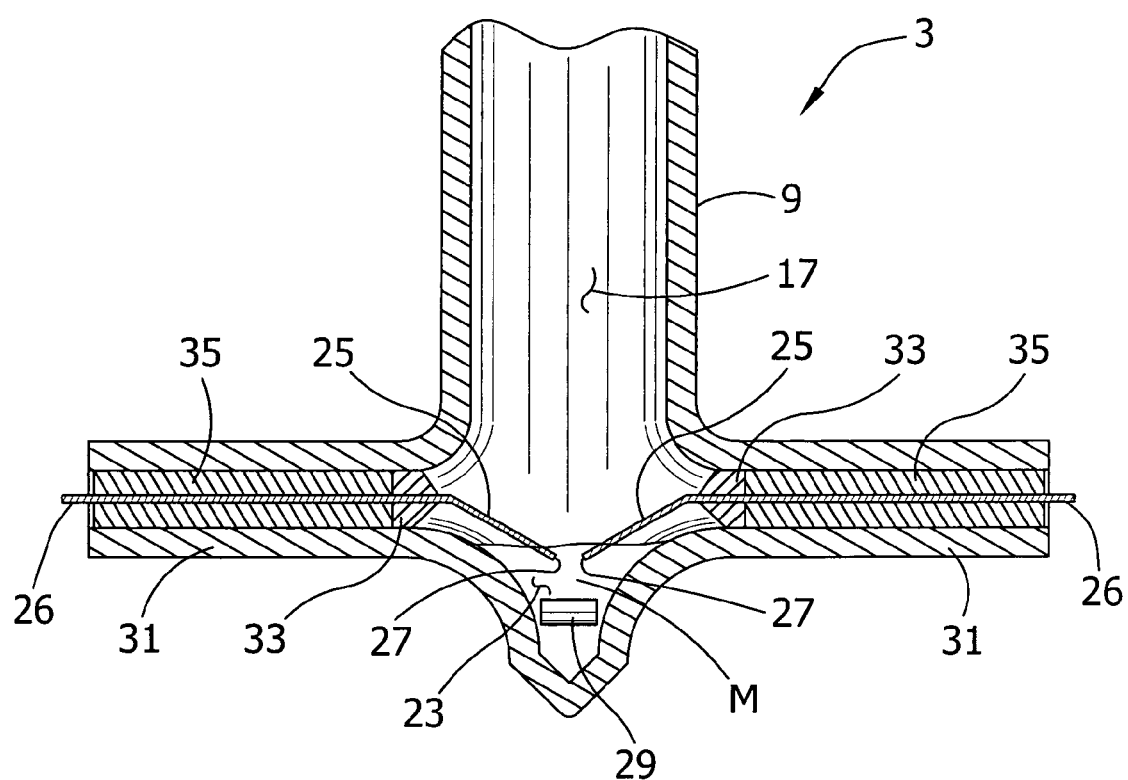
FIG. 6 is an enlarged view of an electrolysis chamber of the electrolysis reactor.

As best illustrated in FIG. 6, the electrolysis chamber 17 comprises a well 23 and two electrodes 25 (i.e., an anode and a cathode) having tips 27 positioned in the well. The well 23 is suitably sized and shaped to minimize the amount of mixture M necessary to perform electrolysis. For example, in the illustrated configuration, the well 23 is conical in shape. Thus, the well 23 has a greater lateral cross-sectional area in the portion of the well near the tips 27 of the electrodes 25 and a progressively smaller lateral cross-sectional area towards the lower end portion 15 of the body 3. As a result, only a small volume of mixture M is needed to fill the well 23 to a level in which the tips 27 of the electrodes 25 are submerged in the mixture while allowing enough clearance beneath the electrodes for a small stir bar 29. It is contemplated that the well 23 can have other configurations besides conical without departing from the scope of this invention. While it is understood that the volume of the well 23 can be any volume, in one embodiment the well has a volume between about 0.5 milliliters and about 3 milliliters. For example, in one configuration, the well 23 has a volume less than about 2 milliliters and, in another configuration, less than about 1 milliliter.

The electrodes 25 are adapted to supply electrical current to a mixture in the electrolysis chamber 17 to electrolyze the mixture to change at least a portion of the mixture from a first state to a second state. As shown in FIG. 6, the tips 27 of the electrodes 25, which are spaced apart about 1 millimeter, are angled downward toward the lower end portion 15 of the reactor body 3. As a result, the electrodes 25 extend into the interior of the well 23 such that they contact mixture received in the electrolysis chamber 17. The arrangement of the electrodes 25 and the volume and shape of the well 23, as described above, permits electrolysis of relatively small amounts of mixture M. For example, in the illustrated configuration, electrolysis can be performed on volumes of mixture M as small as 0.3 milliliters. Moreover, in a configuration in which the stir bar 29 is not placed in the well 23, electrolysis can be performed on mixtures M with volumes as small as 0.1 milliliters. In another configuration, electrolysis can be performed on a mixture M having a volume in a range between about 0.1 milliliters and about 3 milliliters and preferably, a volume less than about 1 milliliter. The electrodes 25 may be platinum wires each having a diameter of approximately 0.5 millimeters. Other materials, such as carbon rods, and other diameters may be used without departing from the scope of this invention.

Referring still to FIG. 6, the electrodes 25 are held in position by two opposed tubular arms 31 extending outwardly from the reactor body 3 adjacent the electrolysis chamber 17. Each arm 31 is sized and shaped for receiving and holding at least one of the electrodes 25. Inner ends of the arms 31 are flame-sealed, as indicated by 33, around the electrodes 25 and solder 35 is placed in the interior space of the arms to help seal the electrolysis chamber 17. The electrodes 25 are soldered to metallic wires 26, which extend-beyond the arms 31 for connection to a suitable source of electrical power. It is understood that the electrodes 25 and metallic wires 26 may be formed from a single wire or a plurality of wires. It is also understood that the electrodes 25 and metallic wires 26 can be formed from the same type of metallic wire (e.g., platinum) or different types.

Figure 3:
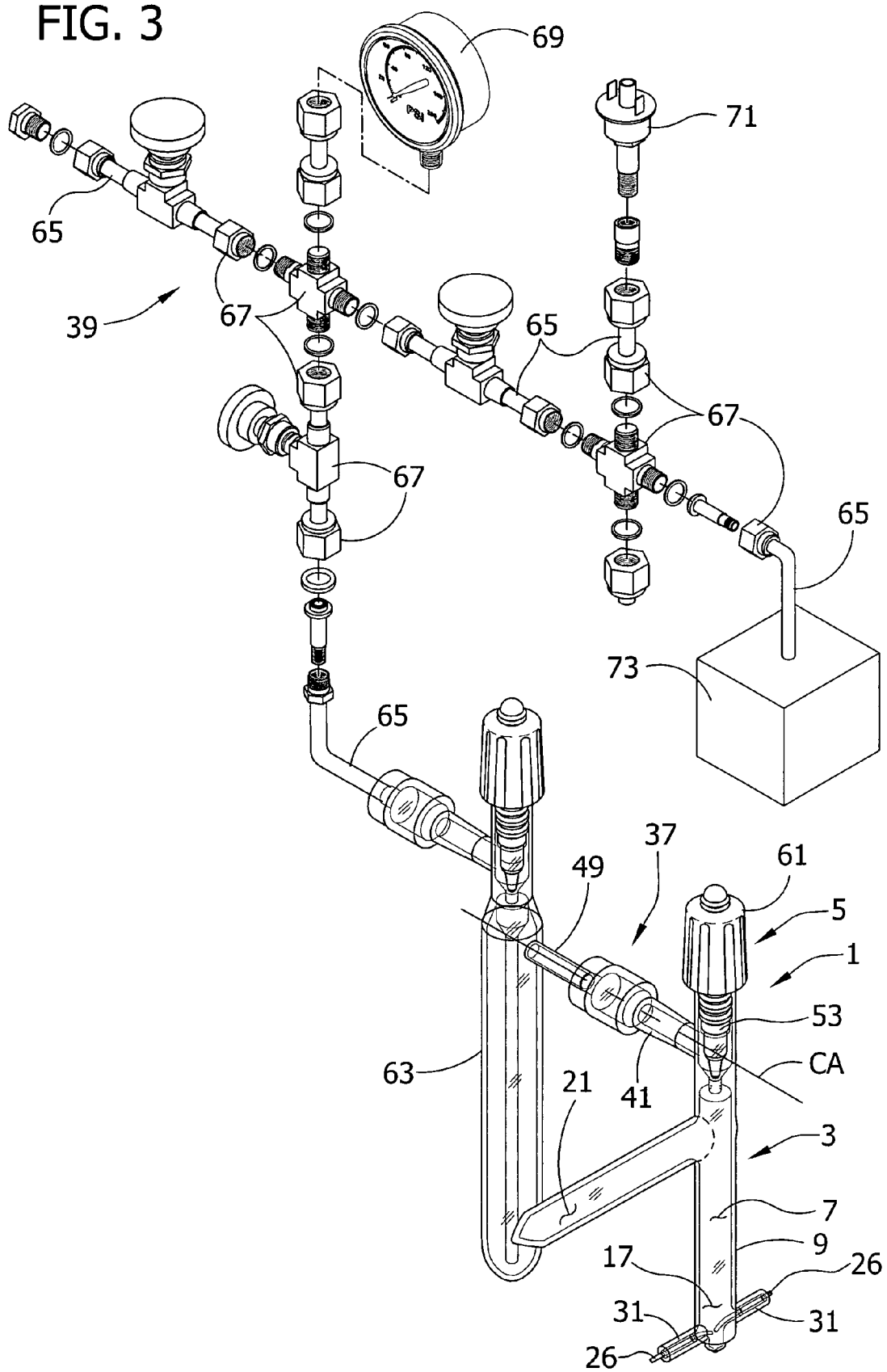
FIG. 3 is a perspective of the electrolysis reactor connected to a manifold using a coupling.

Referring to FIG. 1, the reactor body 3 further comprises a coupling, generally indicated at 37, for releasably and sealingly connecting the reactor body 3 to an auxiliary device, such as a gas source, vacuum producing system, manifold, or analyzer. The reactor body 3 is shown in FIG. 3 connected to a manifold, generally indicated at 39, via the coupling 37. The coupling is adapted to provide a vacuum tight seal between the reactor body 3 and the manifold 39 (or other auxiliary device) and to allow the reactor body to rotate 360° about an axis of rotation CA independent of the manifold (or other auxiliary device) while maintaining the sealed connection. The coupling 37 comprises a second tubular side extension 41 (FIGS. 2 and 7) projecting laterally from the tube 9 at a location above the first side extension 19 forming the mixing chamber 21. The coupling 37 includes a threaded socket 43 in the second tubular side extension 41, an O-ring 45, and a threaded bushing 47 that screws into the threaded socket. In the illustrated embodiment, the second side extension 41 has a length of about 22 millimeters and an inner diameter D3 of about 8 millimeters. The threaded socket 43 of coupling 37 has an inner diameter D4 of about 13 millimeters. It is understood that the length of the second side extension 41 and the diameters D3, D4 of the second side extension and threaded socket 43 can be different.

In use, the bushing 47 and O-ring 45 of the coupling 37 are slid over a tubular portion 49 of the manifold 39 (or other auxiliary device) and the bushing is screwed into the socket 43 thereby compressing the O-ring between the tubular portion and the bushing to form a fluid and vacuum tight seal while permitting rotation of the reactor body 3 about axis CA independent of the auxiliary device while the reactor body is sealingly connected to the manifold. The reactor body 3 can be decoupled from the manifold 39 by unscrewing the bushing 47 from the socket 43. After the bushing 47 has been completely detached from the socket 43, the bushing and O-ring 45 can be removed from the tubular portion 49 of the manifold 39 for subsequent use. The bushing 47 and/or O-ring 45 can be replaced, as needed, between uses.

The reactor 1, including the coupling 37, is grease-free to eliminate a potential source of organic substance which might otherwise adversely affect some uses of the reactor. Greases typically contain carbon, a source of potential contamination in some uses of the reactor 1, such as analyzing carbon isotope ratios through the production and measurement of carbon dioxide.

The stir bar 29 may be placed in the reactor body for stirring the first and second substances FS, SS during mixing of the substances in the mixing chamber 21 and/or for stirring the mixture M during electrolysis of the mixture in the electrolysis chamber 17. The stir bar 29 can be rotated using a conventional magnetic stirrer placed adjacent the stir bar. The stir bar 29 can be moved between the mixing chamber 21 and the electrolysis chamber 17 by rotating the reactor body 3 on axis CA or using a magnet (not shown). When positioned in the electrolysis chamber 17, the stir bar 29 is positioned in the well 23 below the electrodes 25 (FIG. 6). The stir bar may be a small magnetic, non-reactive stir bar, such as a PTFE coated cylinder having a length of about 2 millimeters. It is contemplated that the stir bar may have other sizes and shapes.

Figure 7:
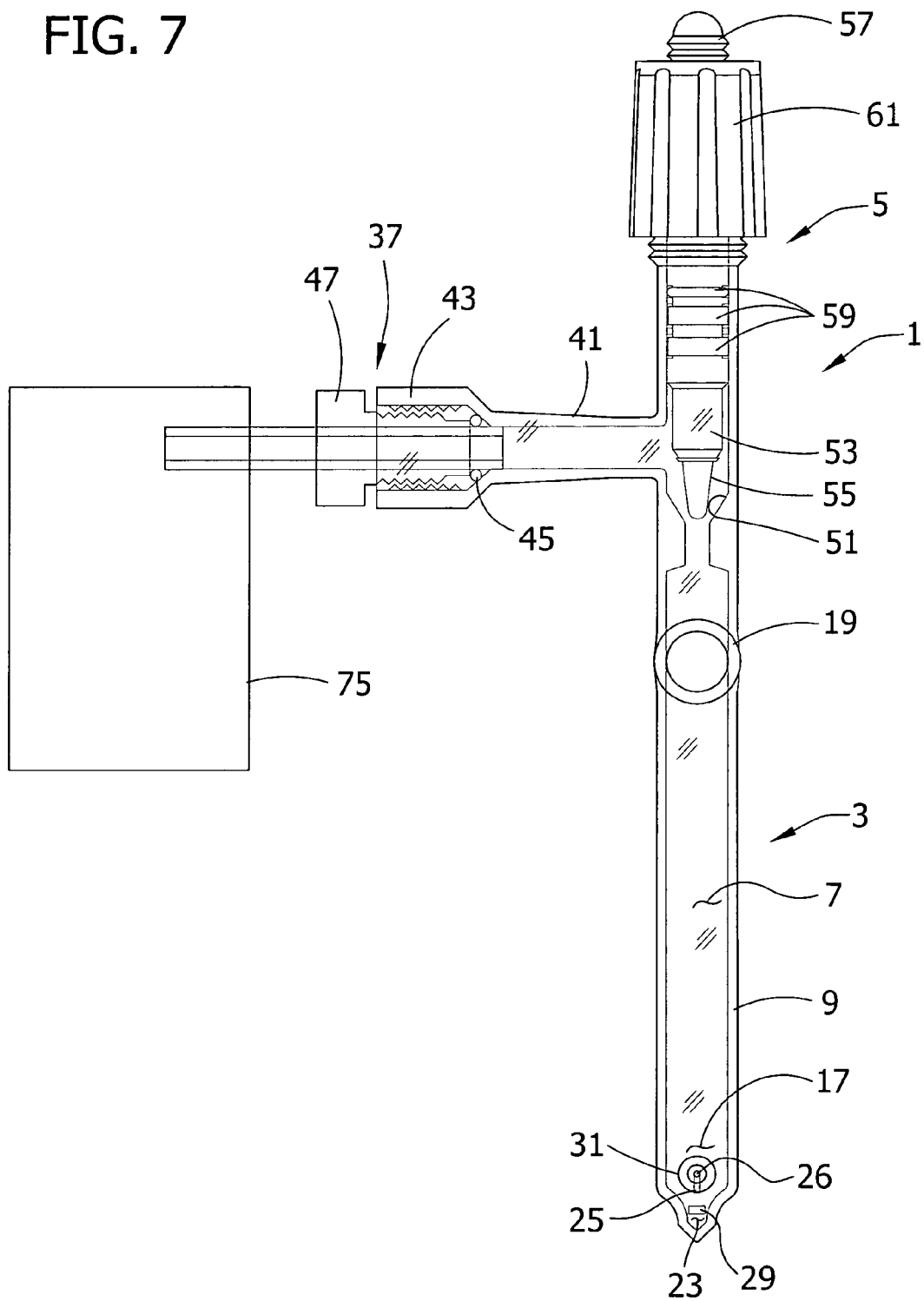
FIG. 7 is a plan view of the electrolysis reactor connected to an analyzer.

Referring to FIGS. 2 and 7, the valve 5 comprises a valve seat 51 in the upper end portion 11 of the reactor tube 9 above the mixing chamber 21, and a valve stem 53 movable in the reactor tube above the valve seat. The stem 53 has a lower end 55 adapted to seal against the valve seat, an upper end 57 formed with external threads, and a series of annular seals 59 disposed between its upper and lower ends for sealing against the side wall of the reactor tube 9. The valve 5 also includes a valve cap 61 having a first set of internal threads (not shown) engageable with external threads on the upper end portion 11 of the reactor tube 9, and a second set of internal threads (not shown) engageable with the external threads on the upper end 57 of the valve stem 53. The two threads of the valve cap 61 are preferably formed in opposite directions. In one configuration, the threads in the valve cap 61 for engaging the external threads on the upper end 57 of the valve stem 53 are formed in a counterclockwise direction and the threads in the valve cap for engaging the upper end portion 11 of the reactor tube 9 are formed in a clockwise direction. The upper end 57 of the valve stem 53 projects up through an opening in the cap 61 so that the valve stem may be turned (rotated) on its axis (coinciding with axis LA) in either direction to raise and lower the valve stem to move it between an open position in which the lower end 55 of the valve stem is spaced from the valve seat 51 a desired distance to allow gas to enter and exit the reactor 1 at a selected flow rate via the coupling 37, and a closed position in which the lower end of the valve stem is in gas-tight sealing contact with the valve seat to seal off the internal volume 7 of the reactor below the valve seat, including the mixing chamber 21, the electrolysis chamber 17, and the head space in the reactor tube 9 above the electrolysis chamber and below the valve seat. In one embodiment, the valve seat 51 is generally conical and the lower end 55 of the stem 53 is somewhat tapered, so that the flow rate of gas past the valve seat is readily and precisely adjustable as needed or desired. Configurations other than that shown may be used to provide the desired adjustability of flow rate. The illustrated valve 5 has a height H2 of about 85 millimeters and an inner diameter D5 of about 10 millimeters but it is understood that the valve can have different heights and diameters.

In the embodiment illustrated in the drawings, the valve seat 51 is integrally formed, such as by using conventional glassblowing techniques, as part of the tubular reactor body 9, but it could be formed as a separate part and secured in place. Also, to facilitate fabrication of the reactor 1, the upper portion of the reactor body 9 containing the valve seat 51 and the valve stem 53 could be formed separate from the lower portion of the reactor body 3, and the upper and lower portions then sealingly attached by suitable means. The reactor body 9 may be fabricated in other ways. One suitable valve 5 is a valve commercially available as product number CG-562 from Chemglass Inc. with offices in Vineland, N.J., U.S.A.

The reactor 1 can be attached to the gas control manifold 39 via the coupling 37 as illustrated in FIG. 3. The illustrated manifold includes a glass condensation trap 63, stainless steel tubing 65, and various metal fittings 67. Attached to the manifold 39 is a mechanical pressure gauge 69, such as model number KXO-HT from McDaniel Controls, Inc. located in Luling, La., U.S.A., for monitoring the pressure of the system, and a thermal conductivity sensor 71, such as model number VT-6 from Teledyne Hastings Instruments with offices in Hampton, Va., U.S.A., for measuring milliTorr-level pressures. Attached to the manifold 39 is a vacuum producing system 73 such as a rotary vacuum pump available as model number TRIVAC D 4-B from Leybold Vacuum USA Inc. with offices in Export, Pa., U.S.A. for applying a regulated vacuum to the manifold and the reactor 1. It is understood that the manifold 39 can have other configurations or be entirely eliminated without departing from the scope of this invention. It is also understood that the vacuum producing system 73 can be another type of auxiliary device (e.g., a pump for introducing a gas under positive pressure into the reactor tube), eliminated entirely, or attached directly to the reactor via the coupling.

Having described the electrolysis reactor 1 in detail, the operation of the reactor will now be described with respect to the electrolysis of acetic acid, which has been isotopically enriched at the C-1 position. It should be appreciated that the description of the electrolysis of acetic acid is provided as an exemplary use of the described reactor and is a non-limiting example. It is understood that the reactor can be used to electrolyze other substances besides acetic acid.

In one working example involving the electrolysis of acetic acid, the stir bar 29 is placed into electrolysis chamber 17 of the reactor body 3 through either the second tubular side extension 41 or the opening 13 in the upper end portion 11 of the reactor body. After the stir bar 29 has been loaded, a known quantity of lithium (i.e., 0.001 mol) is placed in the mixing chamber 21 through the opening 13 using a spatula, and a known quantity (i.e., 0.03 mol) of acetic acid is placed in the electrolysis chamber 17 using a standard pipette. (Lithium is used to promote conductivity of the solution.) Since the reactor 1 can be easily handled, it can be moved to various positions to facilitate loading. For example, the lithium may be placed in the mixing chamber 21 while the mixing chamber is generally vertical and the reactor tube 9 is generally horizontal (FIG. 5). The reactor can then be manually positioned such that the mixing chamber 21 and the reactor tube 9 are each approximately 45° from a vertical position for loading of the acetic acid (FIG. 4). It is understood that the acetic acid can be placed in the reactor before the lithium. It is also understood that the acetic acid can be placed in the mixing chamber and the lithium in the electrolysis chamber.

Once the lithium and acetic acid are placed in their respective chambers 17, 21, the valve stem 53 is installed and moved to its closed position such that the lower end 55 of the valve stem is in sealing contact with the valve seat 51 to seal off the mixing and electrolysis chambers 17, 21 (FIG. 1). For some substances, it may be advantageous to load and seal the reactor 1 in an atmospheric controlled environment, such as a glove box 77 (FIG. 8). For example, if one or both of the substances being loaded into the reactor 1 are unstable in air or water vapor, the reactor can be positioned in the glove box 77, such as through port 79, so that the substances FS, SS and stir bar 29 can be placed in the internal volume 7 of the reactor in a controlled environment. The environment within the glove box 77 can be selectively controlled by pumping inert gas through the glove box via ports 81, 83. The valve 5 is installed by screwing the valve cap 61 onto the upper end portion 11 of the reactor tube 9 while the reactor 1 is positioned in the glove box 77 to seal the reactor. As shown in FIG. 8, the reactor 1 can be manually supported in the glove box 77 using the integrally formed gloves 85. It is also contemplated that a stand (not shown) can be used to support the reactor 1 inside the glove box 77. After the substances FS, SS are sealed in the internal volume 7 of the reactor 1, the reactor can be removed from the glove box 77.

With the valve 5 closed, the reactor 1 is connected to the manifold 39 via the coupling 37 such that both the mixing chamber 21 and the electrolysis chamber 17 are approximately 45° from a vertical position, as shown in FIG. 4. The vacuum producing system 73 is then activated to evacuate the manifold 39 up to the closed valve 5. Next, the valve stem 53 is rotated to open the valve 5 to apply vacuum to the internal volume 7 of the reactor 1 to remove air and water vapor. The rate of flow from the reactor 1 can be adjusted by opening the valve 5 to a greater or lesser extent. During the evacuation process, the stir bar 29 is activated to aid in the degassing of the acetic acid during which bubbles are released from the acid. Degassing is continued until bubbles are no longer visually observed, which may occur within approximately 15 minutes or longer. After the degassing process has been completed, the valve 5 is closed.

Next, the reactor 1 is rotated by hand about the axis CA of the coupling from the position shown in FIG. 4 to the position shown in FIG. 5 in which the electrolysis chamber 17 is generally horizontal and the mixing chamber 21 is generally vertical so that the acetic acid and the stir bar 29 transfer from the electrolysis chamber into the mixing chamber where the acetic acid mixes with the lithium to form a mixture (i.e., an acid-carboxylate solution). The stir bar 29 is activated to facilitate mixing and stirring is continued until the mixture visibly appears homogeneous. It is contemplated that the valve 5 may be opened during the mixing step, a portion of the mixing step, or after the mixing step to maintain a regulated pressure in the reactor body to prevent over pressurization of the reactor.

Once the acid-carboxylate solution appears to be homogenous, the reactor 1 is manually rotated approximately 90° or more such that the mixing chamber 21 is sloped downward towards the electrolysis chamber 17 thereby causing the acid-carboxylate solution and the stir bar 29 to transfer from the mixing chamber into the electrolysis chamber (FIG. 3). Next, electrolysis is carried out using a regulated electrical power source. The power source supplies the requisite current (e.g., between about 1 milliampere and 100 milliampere) to the electrodes 25 to electrolyze the acid-carboxylate solution. The current delivered to the electrodes 25 is preferably monitored to approximate the amount of electrolysis that is occurring inside the reactor 1. The electrolysis is continued until a predetermined charge has been applied by the electrodes 25 to the solution. In one working example, the predetermined charge is approximately 40 coulombs, which occurs between about 5 minutes and 1 hour depending on the applied voltage. Electrolysis of the acid-carboxylate solution produces off gases including carbon dioxide, hydrogen, and ethane. The resulting carbon dioxide is predominantly generated from the carbon located at the C1-position (i.e., the isotopically enriched carbon). The off gases are contained within the internal volume 7 of the reactor 1.

Following electrolysis, the reactor 1 is decoupled from the gas manifold 39. If any residual mixture remains in the well 23, the reactor 1 can be rotated to transfer the residual mixture M to the mixing chamber 21. Once in the mixing chamber 21, the residual mixture M can optionally be solidified by freezing as is known to those skilled in the art.

The reactor 1 is then transferred to a gas analyzer 75 remote from the manifold. For example, the gas analyzer 75 may be located in another portion of the same room, in the same building, or in another building. Using the coupling 37, the reactor 1 is connected to a sampling inlet of the gas analyzer 75, such as mass spectrometer or a gas chromatograph (FIG. 7). The reactor 1 can be connected to the gas analyzer 75 at various angles of rotation about axis CA. For example, as illustrated in FIG. 7, the reactor 1 may be attached to the gas analyzer 75 such that the longitudinal axis LA of tube 9 is generally horizontal. Once the reactor 1 is attached to the analyzer 75 using the coupling 37, the valve 5 is opened as shown in FIG. 7 to allow the off gases to flow from the reactor to the readied gas analyzer. The gas analyzer 75 is then used to analyze the off gases and specifically, the produced carbon dioxide. The measured quantity of carbon dioxide can then be used to quantify the amount of isotopic 13-carbon enrichment at the C1-position as described in May et al., *Vacuum Electrolysis Reactor Technique for Quantitation of 13-Carbon Isotope Enrichment at the C1-Position of Formic Acid and Acetic Acid*, Anal. Chem. 2004, 76, 5313-5318.

After the analysis has been completed, the reactor 1 can be cleaned using protocol known to those skilled in the art, such as properly disposing of any residual acid-carboxylate solution, rinsing the reactor with solvent, and drying the reactor in an oven. After the reactor 1 has been cleaned, it is ready to be used again. Thus, the reactor 1 is adapted to perform numerous electrochemical reactions and to be connected and disconnected from auxiliary devices, such as the manifold 39 and gas analyzer 75, numerous times.

It is understood that the reactor 1 of the present invention can be used to electrolyze substances besides acetic acid. For example, other carboxylic acids, dicarboxylic acids, keto acids, carboxylic acid salts, dicarboxylic acid salts, keto acid salts, or water may be electrolyzed by the reactor of the present invention. Additionally, isotopically enriched substances, such as formic acid-$^{13}$C, acetic acid-1-$^{13}$C, pyruvic acid-1-$^{13}$C, sodium pyruvate-1-$^{13}$C, oxalic acid-$^{13}$C$_2$, water-$^{18}$O, water-$^{17}$O, and water-$^2$H, can be electrolyzed using the present reactor 1. It is also understood that other reactants besides lithium can be used without departing from the scope of this invention. In one process, the reactant is added to the mixture to increase electrical conductivity. For example, the reactant may be selected from a group consisting of water, reactive metals, bases, and acids. Specific reactants besides lithium include, but are not limited to, lithium hydroxide, phosphoric acid, and sulfuric acid. It is also understood that reactants are not needed in all electrochemical reactions and therefore, if desired, can be omitted. For example, formic acid can be electrolyzed neat.

The illustrated reactor 1 is mechanically reliable, compact in size, simple to use, reusable, and free of organic additives, such as grease. For example, the reactor 1 can withstand internal pressures between 0 and 1.5 atmospheres absolute without damage and has a mass of about 0.065 kilograms making it easy to manually transport and handle.

In one compact configuration, the reactor 1 has a height H1 between about 100 millimeters and about 300 millimeters, a depth W1 between about 50 millimeters and about 100 millimeters, and a width W2 between about 60 millimeters and about 250 millimeters. For example, in the illustrated embodiment, the height H1 of the reactor 1 is about 200 millimeters, the depth W1 about 60 millimeters, and the width W2 about 130 millimeters. As shown in FIG. 1, the width W2 can be defined as the distance between the outer end of the first side extension 19 and the outer end of the arm 31 positioned on the opposite side of the tube 9. The dimensions of the reactor 1 provided herein are for exemplary purposes only and it is understood that the reactor and any of its components can have dimensions other than those listed herein without departing from the scope of this invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. An electrochemical reactor comprising:
a reactor body;
a mixing chamber in the reactor body for mixing a first substance with a second substance to form a mixture;
an electrolysis chamber in the reactor body including a pair of electrodes extending therein and without a mechanical barrier therebetween for electrolyzing the mixture thereby to change at least a portion of the mixture from a first chemical state to a second chemical state, the electrolysis chamber being in spatial communication with the mixing chamber for allowing the mixture within the reactor body to be transferred from the mixing chamber to the electrolysis chamber, wherein said electrolysis chamber comprises a well adapted to hold the mixture of not more than about 5 milliliters during electrolysis, wherein said electrolysis chamber comprises two electrodes having tips positioned in said well, wherein said reactor body has first and second arms for holding said electrodes, and wherein said arms are flame sealed.

2. The electrochemical reactor as set forth in claim 1 wherein said well is generally conical in shape.

3. The electrochemical reactor as set forth in claim 1 wherein the tips of the electrodes are spaced apart between about 0.1 millimeter and 1 millimeter.

4. The electrochemical reactor as set forth in claim 1 further comprising a small non-reactive stir bar moveable between the mixing chamber and the electrolysis chamber.

5. The electrochemical reactor as set forth in claim 1 wherein said mixing chamber is disposed at an angle with respect to the electrolysis chamber.

6. The electrochemical reactor as set forth in claim 5 wherein said reactor body has a longitudinal axis, wherein said electrolysis chamber is disposed generally on said longitudinal axis, and wherein said mixing chamber is disposed at an angle of about 90° with respect to said longitudinal axis.

7. The electrochemical reactor as set forth in claim 1 which includes a coupling for releasably and sealingly connecting the reactor body to an auxiliary device, the coupling being adapted to provide a vacuum tight seal between the reactor body and the auxiliary device and to allow the reactor body to rotate about an axis of rotation independent of the auxiliary device position while the reactor body is sealingly connected to the auxiliary device and wherein the coupling is adapted to allow the reactor body to rotate 360° about said axis of rotation.

8. The electrochemical reactor as set forth in claim 7 further comprising a valve for substantially sealing an interior of said coupling thereby isolating the electrochemical reactor from an external vacuum source.

9. The electrochemical reactor as set forth in claim 8 wherein the valve is adjustable for selectively adjusting the flow rate of gas exiting or entering the reactor.

10. The electrochemical reactor as set forth in claim 7 wherein the electrochemical reactor, including said coupling, is free of grease.

11. The electrochemical reactor as set forth in claim 1 wherein said reactor body is an integrated structure comprising an elongate tube having an upper end portion defining an opening, a closed lower end portion defining said electrolysis chamber, a longitudinal axis passing through said upper and lower end portions, a first tubular side extension projecting laterally from said elongate tube at an angle relative to said longitudinal axis, said first tubular side extension being in spatial communication with said elongate tube and forming said mixing chamber; and a valve in said upper end portion of the elongate tube for sealing an internal volume of said integrated structure, including said mixing and electrolysis chambers, said coupling comprising a second tubular side extension projecting laterally from said elongate tube at a location above said first tubular side extension.

12. A reactor for electrolyzing a substance to change at least a portion of the substance from a first chemical state to a chemical second state, the reactor comprising:
a tube having an upper end portion defining an opening and a lower end portion defining an electrolysis chamber comprising a well adapted to hold the substance,
at least two electrodes for electrolyzing the substance in said well, at least a portion of each electrode being located within said well and without a mechanical barrier therebetween, the volume of said well less than about 3 milliliters; and
a coupling for releasably and sealingly connecting the reactor body to an auxiliary device, the coupling being adapted to provide a vacuum tight seal between the reactor body and the auxiliary device and to allow the reactor body to rotate about an axis of rotation independent of the auxiliary device while the reactor body is sealingly connected to the auxiliary device, the coupling interior being in spatial communication with the electrolysis chamber and with said upper end portion.

13. The reactor as set forth in claim 12 wherein the volume of said well is less than about 2 milliliters.

14. The reactor as set forth in claim 13 wherein the volume of said well is less than about 1 milliliter.

15. The reactor as set forth in claim 12 wherein the well is generally conical in shape.

16. The reactor as set forth in claim 12 further comprising two opposed tubular arms extending outwardly from the body adjacent said second end portion of the reactor body, each arm being flame sealed and sized and shaped for receiving at least one electrode.

17. The reactor as set forth in claim 12 wherein said reactor further comprises a mixing chamber for mixing said substance with a reactant, the mixing chamber being in spatial communication with said electrolysis chamber for allowing the substance to be transferred from the mixing chamber to the electrolysis chamber after the substance has been mixed with the reactant.

18. The reactor as set forth in claim 12 further comprising a grease-free coupling for connecting the reactor body to an auxiliary device, the coupling being adapted to provide a vacuum tight seal between the reactor body and the auxiliary device and to allow the reactor body to rotate about an axis of rotation independent of the auxiliary device while the reactor body is sealingly connected to the auxiliary device.

19. The integrated electrochemical reactor as set forth in claim 12 further comprising a valve in said upper end portion of said reactor for substantially sealing the interior of said coupling thereby isolating the integrated electrochemical reactor from an external vacuum source; and the sealed electrochemical reactor able to sustain a substantial vacuum condition for about five hours or for greater time spans.

20. The reactor as set forth in claim 19 wherein the valve is adjustable for selectively adjusting the flow rate of gas exiting or entering the reactor.

* * * * *